(12) United States Patent
Chishty et al.

(10) Patent No.: US 11,050,886 B1
(45) Date of Patent: Jun. 29, 2021

(54) TECHNIQUES FOR SHARING CONTROL OF ASSIGNING TASKS BETWEEN AN EXTERNAL PAIRING SYSTEM AND A TASK ASSIGNMENT SYSTEM WITH AN INTERNAL PAIRING SYSTEM

(71) Applicant: Afiniti, Ltd., Hamilton (BM)

(72) Inventors: Ain Chishty, Rockville, MD (US); Hassan Afzal, Bethesda, MD (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 17/167,920

(22) Filed: Feb. 4, 2021

Related U.S. Application Data

(60) Provisional application No. 62/970,233, filed on Feb. 5, 2020.

(51) Int. Cl.
*H04M 3/523* (2006.01)
*H04M 3/51* (2006.01)

(52) U.S. Cl.
CPC ....... *H04M 3/5191* (2013.01); *H04M 3/5141* (2013.01); *H04M 3/5238* (2013.01)

(58) Field of Classification Search
CPC ............. H04M 3/5232; H04M 3/5238; H04M 3/5141; H04M 3/5191
(Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Afiniti, "Afiniti® Enterprise Behavioral Pairing™ Improves Contact Center Performance," White Paper, retrieved online from URL: <http://www.afinitit.com/wp-content/uploads/2016/04/Afiniti_White-Paper_Web-Email.pdf> 2016, (11 pages).
(Continued)

*Primary Examiner* — Thjuan K Addy
(74) *Attorney, Agent, or Firm* — Wilmer Cutler Pickering Hale and Dorr LLP

(57) ABSTRACT

Techniques for sharing control of assigning tasks between an external pairing system and a task assignment system with an internal pairing system are disclosed. In one embodiment, the techniques may be realized as a method for sharing control of assigning tasks between an external pairing system and a task assignment system with an internal pairing system comprising receiving, from the task assignment system, a plurality of task pairing requests and an agent pairing request, wherein each task request of the plurality of task pairing requests is assigned to one of a first pairing strategy and a second pairing strategy. The agent pairing request may indicate an agent that is available for pairing. The method may further comprise transmitting, to the task assignment system, a pairing recommendation being based in part on the plurality of task pairing requests, the first pairing strategy, the second pairing strategy, and the agent pairing request.

18 Claims, 5 Drawing Sheets

(58) Field of Classification Search
USPC ............ 379/266.03, 266.01, 265.11, 265.12, 379/265.05, 265.14, 265.01, 265.13
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,021,428 A | 2/2000 | Miloslaysky |
| 6,044,355 A | 3/2000 | Crockett et al. |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,404,861 B2 | 9/2019 | Kan et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |

(56) References Cited

U.S. PATENT DOCUMENTS

| | | |
|---|---|---|
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0057569 A1* | 3/2004 | Busey ............... H04M 7/0027 379/265.09 |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McLlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0316793 A1 | 11/2018 | Kan et al. |
| 2018/0316794 A1 | 11/2018 | Kan et al. |
| 2019/0222697 A1 | 7/2019 | Kan et al. |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |

(56) References Cited

FOREIGN PATENT DOCUMENTS

| | | | |
|---|---|---|---|
| EP | 1335572 | A2 | 8/2003 |
| EP | 2338270 | B1 | 4/2018 |
| GB | 2339643 | A | 2/2000 |
| JP | 11-098252 | A | 4/1999 |
| JP | 2000-069168 | A | 3/2000 |
| JP | 2000-078291 | A | 3/2000 |
| JP | 2000-078292 | A | 3/2000 |
| JP | 2000-092213 | A | 3/2000 |
| JP | 2000-507420 | A | 6/2000 |
| JP | 2000-236393 | A | 8/2000 |
| JP | 2000-253154 | A | 9/2000 |
| JP | 2001-292236 | A | 10/2001 |
| JP | 2001-518753 | A | 10/2001 |
| JP | 2002-297900 | A | 10/2002 |
| JP | 3366565 | B2 | 1/2003 |
| JP | 2003-187061 | A | 7/2003 |
| JP | 2004-056517 | A | 2/2004 |
| JP | 2004-227228 | A | 8/2004 |
| JP | 2006-345132 | A | 12/2006 |
| JP | 2007-324708 | A | 12/2007 |
| JP | 2009-081627 | A | 4/2009 |
| JP | 2011-511533 | A | 4/2011 |
| JP | 2011-511536 | A | 4/2011 |
| JP | 2012-075146 | A | 4/2012 |
| JP | 5421928 | B2 | 2/2014 |
| JP | 5631326 | B2 | 11/2014 |
| JP | 5649575 | B2 | 1/2015 |
| JP | 2015-514268 | A | 5/2015 |
| JP | 2015-514371 | A | 5/2015 |
| KR | 10-2002-0044077 | A | 6/2002 |
| KR | 10-2013-0099554 | A | 9/2016 |
| MX | 316118 | | 12/2013 |
| MX | 322251 | | 7/2014 |
| NZ | 587100 | B | 10/2013 |
| NZ | 587101 | B | 10/2013 |
| NZ | 591486 | B | 1/2014 |
| NZ | 592781 | B | 3/2014 |
| PH | 1-2010-501704 | | 2/2014 |
| PH | 1-2010-501705 | | 2/2015 |
| PH | 1-2011-500868 | | 6/2015 |
| WO | WO-1999/17517 | A1 | 4/1999 |
| WO | WO-00/70849 | A2 | 11/2000 |
| WO | WO-2001/063894 | A2 | 8/2001 |
| WO | WO-2006/124113 | A2 | 11/2006 |
| WO | WO-2009/097018 | A1 | 8/2009 |
| WO | WO-2009/097210 | A1 | 8/2009 |
| WO | WO-2010/053701 | A2 | 5/2010 |
| WO | WO-2011/081514 | A1 | 7/2011 |
| WO | WO-2013/148453 | A1 | 10/2013 |
| WO | WO-2015/019806 | A1 | 2/2015 |
| WO | WO-2016/048290 | A1 | 3/2016 |

OTHER PUBLICATIONS

Anonymous, (2006) "Performance Based Routing in Profit Call Centers," The Decision Makers' Direct, located at www.decisioncraft.com, Issue Jun. 2002, (3 pages).
Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).
Cleveland, William S., "Robust Locally Weighted Regression and Smoothing Scatterplots," Journal of the American Statistical Association, vol. 74, No. 368, pp. 829-836 (Dec. 1979).
Cormen, T.H., et al., " Introduction to Algorithms", Third Edition, Chapter 26 and 29, 2009, (116 pages).
Gans, N. et al., "Telephone Call Centers: Tutorial, Review and Research Prospects," Manufacturing & Service Operations Management, vol. 5, No. 2, 2003, pp. 79-141, (84 pages).
International Preliminary Report on Patentability and Written Opinion issued in connection with PCT/US2009/066254 dated Jun. 14, 2011, (6 pages).

International Search Report and Written Opinion issued by the European Patent Office as International Searching Authority for PCT/IB2016/001762 dated Feb. 20, 2017, (15 pages).
International Search Report and Written Opinion issued by the European Patent Office as International Searching Authority for PCT/IB2016/001776 dated Mar. 3, 2017, (16 pages).
International Search Report and Written Opinion issued by the European Patent Office as International Searching Authority for PCT/IB2017/000570 dated Jun. 30, 2017, (13 pages).
International Search Report and Written Opinion issued by the European Patent Office as International Searching Authority for PCT/IB2018/000434 dated Jun. 20, 2018, (14 pages).
International Search Report and Written Opinion issued in connection with PCT/IB2018/000886 dated Dec. 4, 2018, (13 pages).
International Search Report and Written Opinion issued in connection with PCT/IB2018/000907 dated Nov. 26, 2018, (11 pages).
International Search Report issued in connection with PCT/US/2009/054352 dated Mar. 12, 2010, (5 pages).
International Search Report issued in connection with PCT/US2008/077042 dated Mar. 13, 2009, (3 pages).
International Search Report issued in connection with PCT/US2009/031611 dated Jun. 3, 2009, (5 pages).
International Search Report issued in connection with PCT/US2009/061537 dated Jun. 7, 2010, (5 pages).
International Search Report issued in connection with PCT/US2009/066254 dated Feb. 24, 2010, (4 pages).
International Search Report issued in connection with PCT/US2013/033261 dated Jun. 14, 2013, (3 pages).
International Search Report issued in connection with PCT/US2013/033265 dated Jul. 9, 2013, (2 pages).
International Search Report issued in connection with PCT/US2013/033268 dated May 31, 2013, (2 pages).
Ioannis Ntzoufras "Bayesian Modeling Using Winbugs an Introduction", Department of Statistics, Athens University of Economics and Business, Wiley-Interscience, A John Wiley & Sons, Inc., Publication, Chapter 5, Jan. 1, 2007, pp. 155-220 (67 pages).
Koole, G. et al., "An Overview of Routing and Staffing Algorithms in Multi-Skill Customer Contact Centers," Manuscript, Mar. 6, 2006, (42 pages).
Koole, G., "Performance Analysis and Optimization in Customer Contact Centers," Proceedings of the Quantitative Evaluation of Systems, First International Conference, Sep. 27-30, 2004, (4 pages).
Nocedal, J. and Wright, S. J., "Numerical Optimization," Chapter 16 Quadratic Programming, 2006, pp. 448-496 (50 pages).
Ntzoufras, "Bayesian Modeling Using Winbugs". Wiley Interscience, Chapter 5, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Riedmiller, M. et al., "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591 (8 pages).
Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).
Written Opinion of the International Searching Authority issued in connection with PCT/US/2009/054352 dated Mar. 12, 2010, (5 pages).
Written Opinion of the International Searching Authority issued in connection with PCT/US2008/077042 dated Mar. 13, 2009, (6 pages).
Written Opinion of the International Searching Authority issued in connection with PCT/US2009/031611 dated Jun. 3, 2009, (7 pages).
Written Opinion of the International Searching Authority issued in connection with PCT/US2009/061537 dated Jun. 7, 2010, (10 pages).
Written Opinion of the International Searching Authority issued in connection with PCT/US2009/066254 dated Feb. 24, 2010, (5 pages).

(56) References Cited

OTHER PUBLICATIONS

Written Opinion of the International Searching Authority issued in connection with PCT/US2013/033261 dated Jun. 14, 2013, (7 pages).
Written Opinion of the International Searching Authority issued in connection with PCT/US2013/033265 dated Jul. 9, 2013, (7 pages).
Written Opinion of the International Searching Authority issued in connection with PCT/US2013/033268 dated May 31, 2013, (7 pages).

* cited by examiner

TECHNIQUES FOR SHARING CONTROL OF ASSIGNING TASKS BETWEEN AN EXTERNAL PAIRING SYSTEM AND A TASK ASSIGNMENT SYSTEM WITH AN INTERNAL PAIRING SYSTEM

CROSS-REFERENCE TO RELATED APPLICATIONS

This patent application claims priority to U.S. Provisional Patent Application No. 62/970,233, filed Feb. 5, 2020, which is hereby incorporated by reference herein in its entirety.

FIELD OF THE DISCLOSURE

The present disclosure generally relates to task assignment systems and, more particularly, to techniques for sharing control of assigning tasks between an external pairing system and a task assignment system with an internal pairing system.

BACKGROUND OF THE DISCLOSURE

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents, improve upon traditional pairing methods. BP targets balanced utilization of agents while simultaneously improving overall task assignment system performance potentially beyond what FIFO or PBR methods may achieve in practice.

Traditionally, a pairing system is integrated into a task assignment system and is capable of switching between pairing strategies (e.g., FIFO, PBR, BP, etc.) as needed. Switching between different pairing strategies may be straightforward for the pairing system integrated into the task assignment given that all the states (e.g., information and events about tasks and agents, pairing strategy used for different tasks, etc.) of the task assignment system may be readily available to or otherwise retrievable by the pairing system. However, if a pairing system is external to a task assignment system, all the states of the task assignment system may not be available to the pairing system for efficient pairing of tasks with agents. Thus, it may be understood that there may be a need for techniques for sharing control of assigning tasks between an external pairing system and a task assignment system with an internal pairing system.

SUMMARY OF THE DISCLOSURE

Techniques for sharing control of assigning tasks between an external pairing system and a task assignment system with an internal pairing system are disclosed. In one particular embodiment, the techniques may be realized as a method for pairing contacts and agents in a contact center system comprising: determining, by at least one computer processor communicatively coupled to and configured to operate in the contact center system, a first set of contacts to be paired using a first pairing strategy; determining, by the at least one computer processor, a second set of contacts to be paired using a second pairing strategy; determining, by the at least one computer processor, a third set of contacts to be paired using the first pairing strategy; determining, by the at least one computer processor, a fourth set of contacts to be paired using the second pairing strategy; and connecting, by the at least one computer processor, contacts of the first, second, third, and fourth sets of contacts to agents in the contact center based on a pairing strategy associated with each contact, wherein the second set of contacts arrived after the first set of contacts, wherein the third set of contacts arrived after the second set of contacts, wherein the fourth set of contacts arrived after the third set of contacts, wherein all contacts of the second set of contacts must be paired, using the second pairing strategy, prior to pairing any of the contacts of the fourth set of contacts, wherein the connecting further comprises selecting at least one contact of the third set of contacts for pairing before all contacts of the first set of contacts are paired and selecting at least one contact of the first set of contacts for pairing before all contacts of the third set of contacts are paired, wherein there exists an agent in the contact center system available for pairing under both the first and second pairing strategies.

In accordance with other aspects of this particular embodiment, the first pairing strategy may be a behavioral pairing strategy.

In accordance with other aspects of this particular embodiment, the second pairing strategy may be a first-in, first-out (FIFO) pairing strategy.

In accordance with other aspects of this particular embodiment, the method may further comprise selecting, by the at least one computer processor, the first pairing strategy or the second pairing strategy based on a tie-breaking strategy, and selecting, by the at least one computer processor, a contact of the first, second, third, or fourth sets of contacts for pairing based on the selected pairing strategy.

In accordance with other aspects of this particular embodiment, the tie-breaking strategy may be one of a queue flush strategy, a queue length strategy, a queue wait strategy, or a sequential strategy.

In accordance with other aspects of this particular embodiment, the first pairing strategy may be provided by an external pairing system, and the second pairing strategy may be provided by one of the external pairing system and an internal pairing system of the contact center system.

In another embodiment, the techniques may be realized as a method comprising: determining, by at least one computer processor communicatively coupled to and configured to operate in a contact center system, a first contact waiting in the contact center system; determining, by the at least one computer processor, a second contact waiting in the contact center system; pairing, by the at least one computer processor, the second contact based on information about the first contact; and after pairing the second contact, pairing, by the at least one computer processor, the first contact based on information about the second contact, wherein the information about the second contact comprises information other than the pairing of the second contact.

In accordance with other aspects of this particular embodiment, pairing the first contact and pairing the second contact may be based on a first pairing strategy.

In accordance with other aspects of this particular embodiment, the method may further comprise determining, by the at least one computer processor, at least one additional contact waiting in the contact center system; selecting, by the at least one computer processor, a pairing strategy from a plurality of pairing strategies, wherein the plurality of pairing strategies comprises the first pairing strategy; and pairing, by the at least one computer processor, the at least one additional contact based on the selected pairing strategy.

In accordance with other aspects of this particular embodiment, selecting the pairing strategy may be based on a tie-breaking strategy.

In accordance with other aspects of this particular embodiment, the tie breaking strategy may be one of a queue flush strategy, a queue length strategy, a queue wait strategy, or a sequential strategy.

In accordance with other aspects of this particular embodiment, at least one of the information about the first contact and the information about the second contact may comprise a time of arrival.

In another embodiment, the techniques may be realized as a method comprising: receiving, by at least one computer processor communicatively coupled to and configured to operate in a contact center system, a first plurality of contacts associated with a first pairing strategy; receiving, by the at least one computer processor, a second plurality of contacts associated with a second pairing strategy; receiving, by the at least one computer processor, a third plurality of contacts associated with the first pairing strategy; receiving, by the at least one computer processor, a plurality of available agents, pairing, by the at least one computer processor, each of the plurality of available agents to contacts of the first or third pluralities of contacts using the first pairing strategy; wherein a number of the plurality of available agents is greater than a number of the first plurality of contacts, wherein the second plurality of contacts is received after the first plurality of contacts, herein the third plurality of contacts is received after the second plurality of contacts, wherein any prioritization applied to the third plurality of contacts does not imply an assignment of the third plurality of contacts prior to the second plurality of contacts, wherein no other contacts were received between the receiving of the first and second pluralities of contacts, wherein, if an agent of the plurality of agents becomes available after pairing each of the plurality of available agents, pairing said agent to contacts of the first, second, or third pluralities of contacts based on a tie-breaking strategy.

In accordance with other aspects of this particular embodiment, the prioritization may arise from a number of contacts pending assignment.

In accordance with other aspects of this particular embodiment, the prioritization may arise from an expected wait time.

In accordance with other aspects of this particular embodiment, the tie-breaking strategy may comprise one of a queue length strategy or a queue wait strategy.

In accordance with other aspects of this particular embodiment, the tie-breaking strategy may comprise generating a random number and selecting a contact for pairing based on the generated random number.

In accordance with other aspects of this particular embodiment, the random number may be weighted according to a proportion of contacts associated with either the first pairing strategy or the second pairing strategy.

In another embodiment, the techniques may be realized as a method for sharing control of assigning tasks between an external pairing system and a task assignment system with an internal pairing system comprising receiving, by at least one computer processor communicatively coupled to and configured to operate in the external pairing system, from the task assignment system over an application programming interface, a plurality of task pairing requests and an agent pairing request, wherein each task request of the plurality of task pairing requests is assigned to one of a first pairing strategy and a second pairing strategy, wherein the agent pairing request indicates an agent that is available for pairing, and transmitting, by the at least one computer processor, to the task assignment system, a pairing recommendation, wherein the pairing recommendation is based at least in part on the plurality of task pairing requests, the first pairing strategy, the second pairing strategy, and the agent pairing request.

In accordance with other aspects of this particular embodiment, the external pairing system may perform a tie-breaking strategy to choose between the first pairing strategy and the second pairing strategy.

In accordance with other aspects of this particular embodiment, the tie-breaking strategy may be one of a sequential strategy, queue length strategy, queue wait strategy, and queue flush strategy.

In accordance with other aspects of this particular embodiment, the task assignment system may be a contact center system.

In accordance with other aspects of this particular embodiment, the first pairing strategy may be a behavioral pairing strategy.

In accordance with other aspects of this particular embodiment, the second pairing strategy may be one of a first-in, first-out strategy and a performance-based routing strategy.

In accordance with other aspects of this particular embodiment, the first pairing strategy may be provided by the external pairing system, and the second pairing strategy may be provided by one of the external pairing system and an internal pairing system of the task assignment system.

In another embodiment, the techniques may be realized as a method for sharing control of assigning tasks between an external pairing system and a task assignment system with an internal pairing system comprising transmitting, by at least one computer processor communicatively coupled to and configured to operate in the task assignment system, to the external pairing system over an application programming interface, a plurality of task pairing requests and an agent pairing request, wherein each task request of the plurality of task pairing requests is assigned to one of a first pairing strategy and a second pairing strategy, wherein the agent pairing request indicates an agent that is available for pairing, and receiving, by the at least one computer processor, from the external pairing system, a pairing recommendation, wherein the pairing recommendation is based at least in part on the plurality of task pairing requests, the first pairing strategy, the second pairing strategy, and the agent pairing request.

In accordance with other aspects of this particular embodiment, the external pairing system may perform a tie-breaking strategy to choose between the first pairing strategy and the second pairing strategy.

In accordance with other aspects of this particular embodiment, the tie-breaking strategy may be one of a sequential strategy, queue length strategy, queue wait strategy, and queue flush strategy.

In accordance with other aspects of this particular embodiment, the task assignment system may be a contact center system.

In accordance with other aspects of this particular embodiment, the first pairing strategy may be a behavioral pairing strategy.

In accordance with other aspects of this particular embodiment, the second pairing strategy may be one of a first-in, first-out strategy and a performance-based routing strategy.

In accordance with other aspects of this particular embodiment, the first pairing strategy may be provided by the external pairing system, and the second pairing strategy may be provided by one of the external pairing system and the internal pairing system of the task assignment system.

In another particular embodiment, the techniques may be realized as a system comprising at least one computer processor communicatively coupled to and configured to operate in a task assignment system or a contact center system, wherein the at least one computer processor is further configured to perform the steps in the above-described methods.

In another particular embodiment, the techniques may be realized as an article of manufacture comprising a non-transitory processor readable medium and instructions stored on the medium, wherein the instructions are configured to be readable from the medium by at least one computer processor communicatively coupled to and configured to operate in a task assignment system or a contact center system and thereby cause the at least one computer processor to operate so as to perform the steps in the above-described methods.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
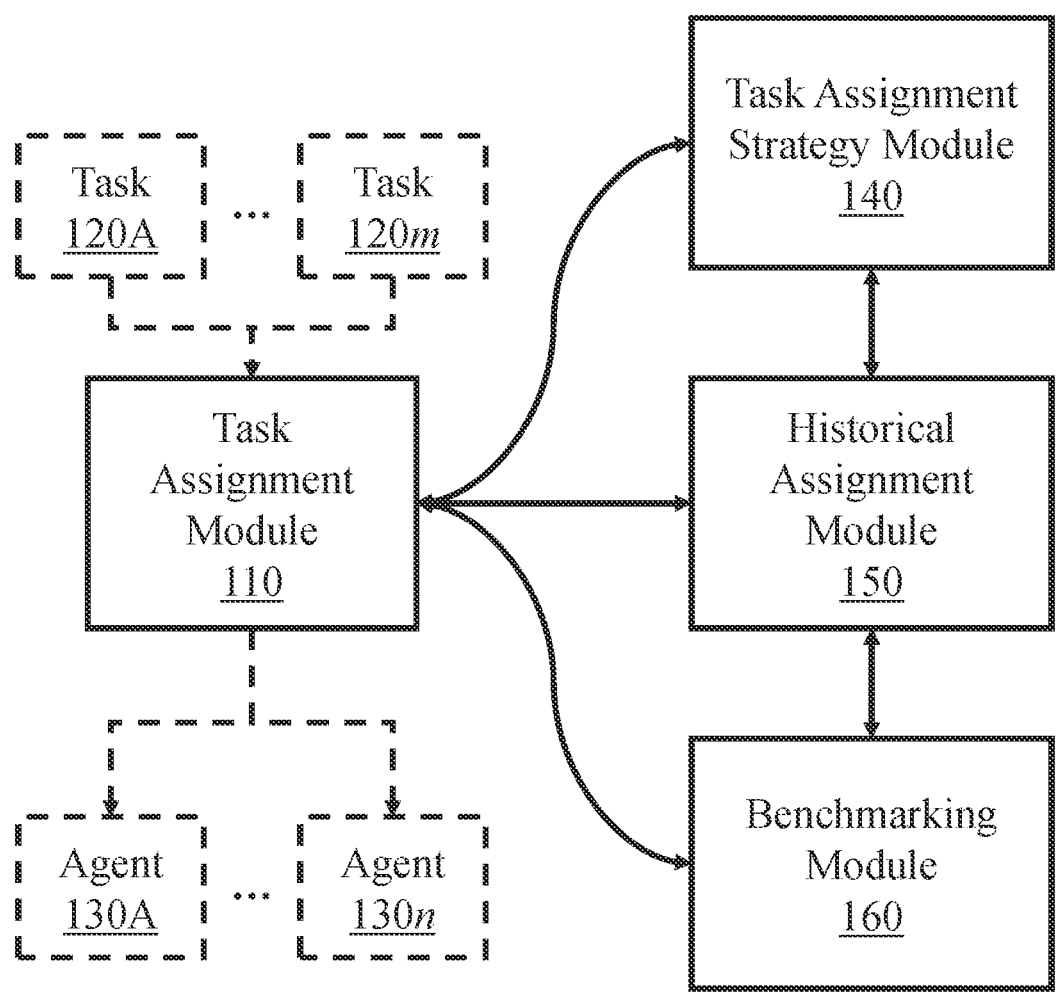
FIG. 1 shows a block diagram of a pairing system according to embodiments of the present disclosure.

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment. An example of a task assignment system is a contact center system that receives contacts (e.g., telephone calls, internet chat sessions, emails, etc.) to be assigned to agents.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents that improve upon traditional pairing methods. BP targets balanced utilization of agents while simultaneously improving overall task assignment system performance potentially beyond what FIFO or PBR methods will achieve in practice. This is a remarkable achievement inasmuch as BP acts on the same tasks and same agents as FIFO or PBR methods, approximately balancing the utilization of agents as FIFO provides, while improving overall task assignment system performance beyond what either FIFO or PBR provides in practice. BP improves performance by assigning agent and task pairs in a fashion that takes into consideration the assignment of potential subsequent agent and task pairs such that, when the benefits of all assignments are aggregated, they may exceed those of FIFO and PBR strategies.

Various BP strategies may be used, such as a diagonal model BP strategy or a network flow BP strategy. These task assignment strategies and others are described in detail for a contact center context in, e.g., U.S. Pat. Nos. 9,300,802, 9,781,269, 9,787,841, and 9,930,180, all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

Traditionally, a pairing system is integrated into a task assignment system and is capable of switching between pairing strategies (e.g., FIFO, PBR, BP, etc.) as needed. Switching between different pairing strategies may be straightforward for the pairing system integrated into the task assignment given that all the states (e.g., information and events about tasks and agents, pairing strategy used for different tasks, etc.) of the task assignment system may be readily available to or otherwise retrievable by the pairing system. However, if a pairing system is external to a task assignment system, all the states of the task assignment system may not be available to the pairing system for efficient pairing of tasks with agents. As explained in detail below, embodiments of the present disclosure relate to techniques for sharing control of a task assignment system between an external pairing system and an internal pairing system.

The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

FIG. 1 shows a block diagram of a pairing system 100 according to embodiments of the present disclosure. The pairing system 100 may be included in a task assignment system (e.g., contact center system) or incorporated in a component or module (e.g., a pairing module) of a task assignment system for helping to assign tasks (e.g., contacts) among various agents.

The pairing system 100 may include a task assignment module 110 that is configured to pair (e.g., match, assign) incoming tasks to available agents. In the example of FIG. 1, m tasks 120A-120m are received over a given period, and n agents 130A-130n are available during the given period. Each of the m tasks may be assigned to one of the n agents for servicing or other types of task processing. In the example of FIG. 1, m and n may be arbitrarily large finite integers greater than or equal to one. In a real-world task assignment system, such as a contact center system, there may be dozens, hundreds, etc. of agents logged into the contact center system to interact with contacts during a shift, and the contact center system may receive dozens, hundreds, thousands, etc. of contacts (e.g., telephone calls, internet chat sessions, emails, etc.) during the shift.

In some embodiments, a task assignment strategy module 140 may be communicatively coupled to and/or configured to operate in the pairing system 100. The task assignment strategy module 140 may implement one or more task assignment strategies (or "pairing strategies") for assigning individual tasks to individual agents (e.g., pairing contacts with contact center agents). A variety of different task assignment strategies may be devised and implemented by the task assignment strategy module 140. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or an off-diagonal strategy such as a network flow BP strategy. See U.S. Pat. Nos. 9,300,802; 9,781,269; 9,787,841; and 9,930,180.

In some embodiments, a historical assignment module 150 may be communicatively coupled to and/or configured to operate in the pairing system 100 via other modules such as the task assignment module 110 and/or the task assignment strategy module 140. The historical assignment module 150 may be responsible for various functions such as monitoring, storing, retrieving, and/or outputting information about task-agent assignments that have already been made. For example, the historical assignment module 150 may monitor the task assignment module 110 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc. In some embodiments, the historical assignment module 150 may generate a pairing model or a similar computer processor-generated model based on a set of historical assignments for a period of time (e.g., the past week, the past month, the past year, etc.), which may be used by the task assignment strategy module 140 to make task assignment recommendations or instructions to the task assignment module 110.

In some embodiments, a benchmarking module 160 may be communicatively coupled to and/or configured to operate in the pairing system 100 via other modules such as the task assignment module 110 and/or the historical assignment module 150. The benchmarking module 160 may designate incoming tasks as "ON" or "OFF" tasks. As described later, the pairing system handles the assignment of tasks to agents differently based on the "ON" or "OFF" labels assigned to the tasks. In some embodiments, the benchmarking module 160 may perform other functions, such as establishing a benchmarking schedule for cycling among various pairing strategies, tracking cohorts (e.g., base and measurement groups of historical assignments), etc. In some embodiments, the benchmarking module may be programmed with different benchmarking techniques such as, epoch benchmarking and inline benchmarking. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of a pairing strategy to determine, for example, whether a different pairing strategy (or a different pairing model) should be used, or to measure the overall performance (or performance gain) that was achieved within the task assignment system while it was optimized or otherwise configured to use one pairing strategy instead of another.

Figure 2:
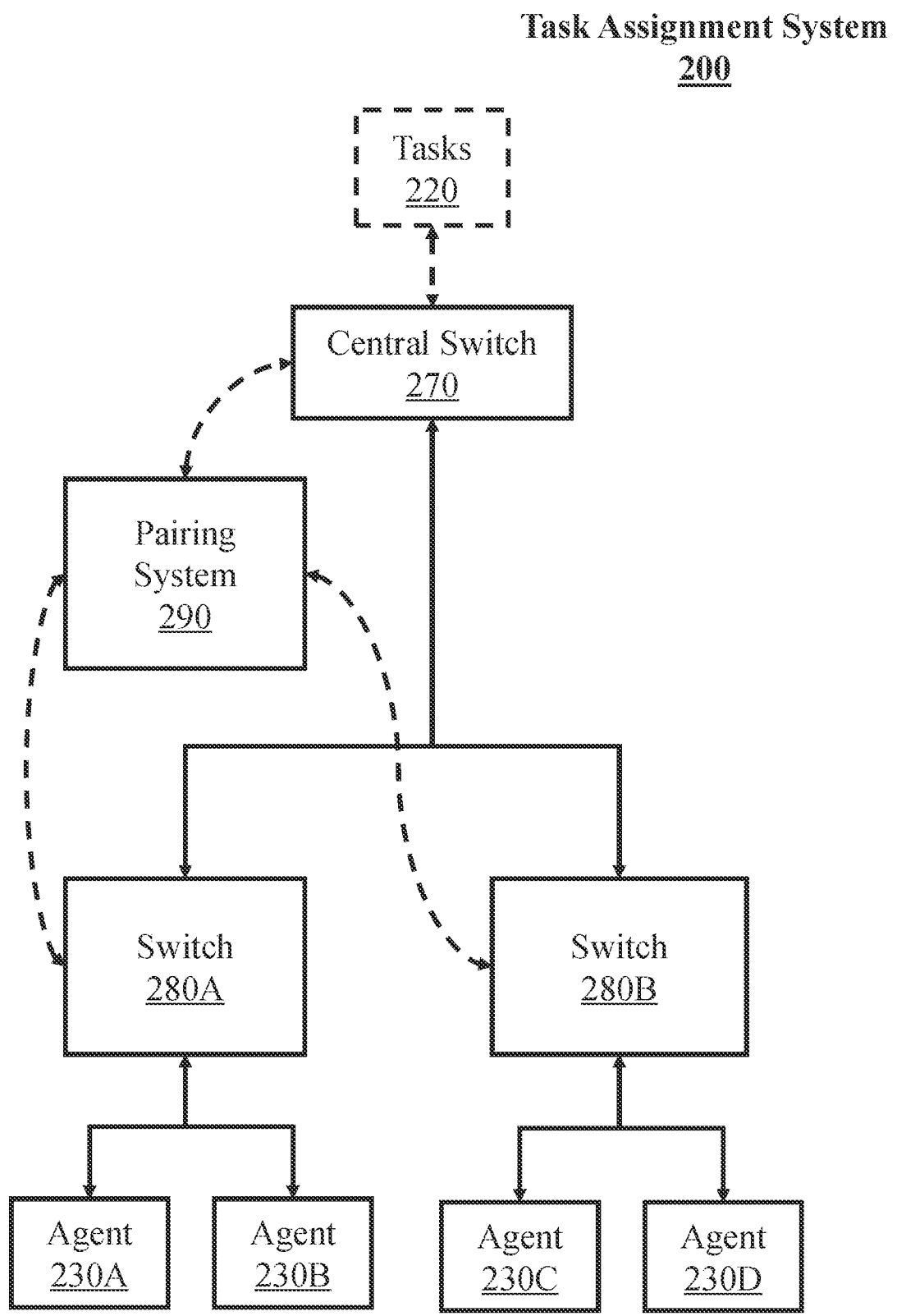
FIG. 2 shows a block diagram of a task assignment system according to embodiments of the present disclosure.

FIG. 2 shows a block diagram of a task assignment system 200 according to embodiments of the present disclosure. The task assignment system 200 may include a central switch 270. The central switch 270 may receive incoming tasks 220 (e.g., telephone calls, internet chat sessions, emails, etc.) or support outbound connections to contacts via a dialer, a telecommunications network, or other modules (not shown). The central switch 270 may include routing hardware and software for helping to route tasks among one or more queues (or subcenters), or to one or more Private Branch Exchange ("PBX") or Automatic Call Distribution (ACD) routing components or other queuing or switching components within the task assignment system 200. The central switch 270 may not be necessary if there is only one queue (or subcenter), or if there is only one PBX or ACD routing component in the task assignment system 200.

If more than one queue (or subcenter) is part of the task assignment system 200, each queue may include at least one switch (e.g., switches 280A and 280B). The switches 280A and 280B may be communicatively coupled to the central switch 270. Each switch for each queue may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another task, performing certain post-call functions such as logging information about the call, or taking a break. In the example of FIG. 2, the central switch 270 routes tasks to one of two queues via switch 280A and switch 280B, respectively. Each of the switches 280A and 280B are shown with two agents each. Agents 230A and 230B may be logged into switch 280A, and agents 230C and 230D may be logged into switch 280B.

The task assignment system 200 may also be communicatively coupled to an integrated pairing system 290. The pairing system 290 may be native to (or built in) the task assignment system 200 (i.e., "first-party") or may be a service provided by, for example, a third-party vendor. In the example of FIG. 2, the pairing system 290 may be communicatively coupled to one or more switches in the switch system of the task assignment system 200, such as central switch 270, switch 280A, and switch 280B. In some embodiments, switches of the task assignment system 200 may be communicatively coupled to multiple pairing systems. In some embodiments, the pairing system 290 may be embedded within a component of the task assignment system 200 (e.g., embedded in or otherwise integrated with a switch). An example of the pairing system 290 is the pairing system 100, which is described above.

The pairing system 290 may receive information from a switch (e.g., switch 280A) about agents logged into the switch (e.g., agents 230A and 230B) and about incoming tasks 220 via another switch (e.g., central switch 270) or, in some embodiments, from a network (e.g., the Internet or a telecommunications network) (not shown). The pairing system 290 may process this information to determine which tasks should be paired (e.g., matched, assigned, distributed, routed) with which agents.

For example, in an L1 state, multiple agents may be available and waiting for connection to a task, and a task arrives at the task assignment system 200 via a network or the central switch 270. As explained above, without the pairing system 290, a switch will typically automatically distribute the new task to whichever available agent has been waiting the longest amount of time for an agent under a FIFO strategy, or whichever available agent has been determined to be the highest-performing agent under a PBR strategy. With the pairing system 290, contacts and agents may be given scores (e.g., percentiles or percentile ranges/bandwidths) according to a pairing model or other artificial intelligence data model, so that a task may be matched, paired, or otherwise connected to a preferred agent.

In an L2 state, multiple tasks are available and waiting for connection to an agent, and an agent becomes available. These tasks may be queued in a switch such as a PBX or ACD device. Without the pairing system 290, a switch will typically connect the newly available agent to whichever task has been waiting on hold in the queue for the longest amount of time as in a FIFO strategy or a PBR strategy when agent choice is not available. In some task assignment centers, priority queuing may also be incorporated, as previously explained. With the pairing system 290 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task.

In the task assignment system 200, the pairing system 290 may switch between pairing strategies based on determining whether a task is an "ON" task or an "OFF" task. The tasks may be assigned these labels by the benchmarking module 160 as described in FIG. 1. Given that the pairing system 290 is integrated with—or "internal" to—the task assignment system 200, states of the task assignment system 200 (e.g., information and events about tasks and agents, pairing strategy used for every assignment, etc.) may be readily available to or otherwise retrievable by the pairing system 290. However, in a task assignment system with an external pairing system, assigning tasks may not be as straightforward, as will be described next.

Figure 3:
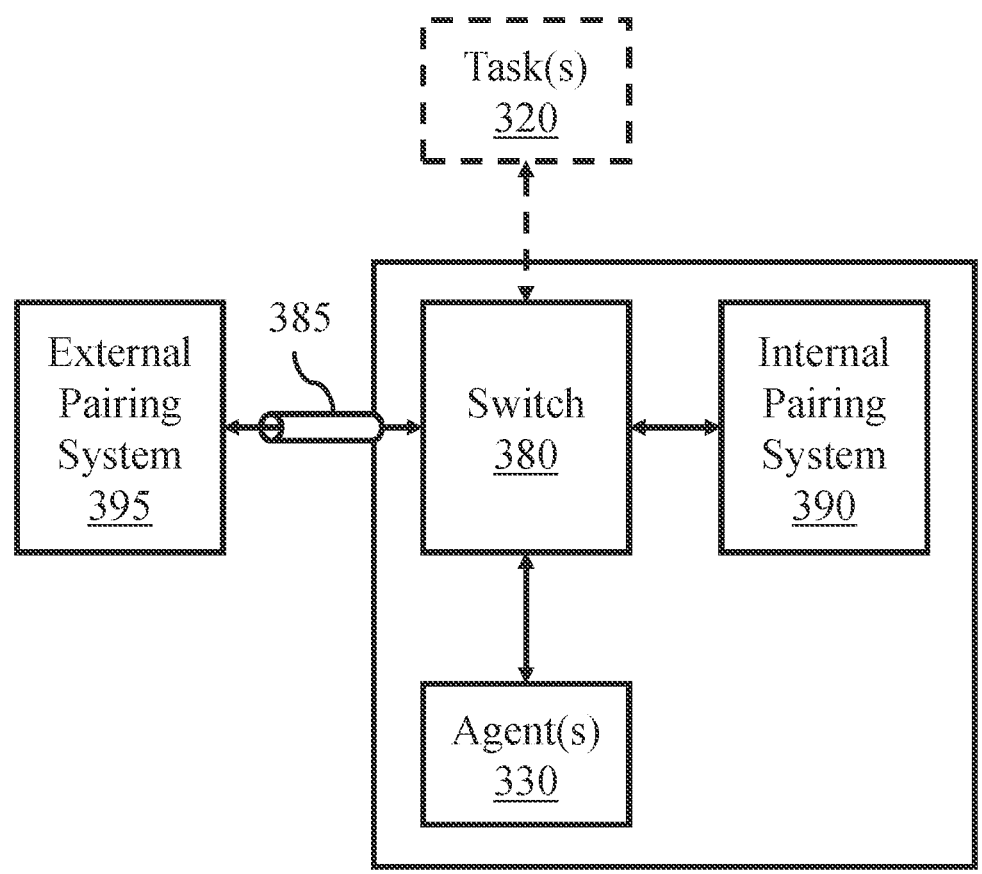
FIG. 3 shows a block diagram of a task assignment system with an external pairing system according to embodiments of the present disclosure.

FIG. 3 shows a block diagram of a task assignment system 300 with an external pairing system 395 according to embodiments of the present disclosure. In the task assignment system 300, a switch 380 may route a plurality of tasks 320 to a plurality of agents 330. The switch 380 may include routing hardware and software, or to one or more PBX or ACD routing components or other queuing or switching components for helping to route the plurality of tasks 320 among the plurality of agents 330.

In the task assignment system 300, an internal pairing system 390 may be communicatively coupled to the switch 380. The internal pairing system 390 may be native to (or built in) the task assignment system 300 (i.e., "first-party") or may be provided by a third-party vendor. Typically, the internal pairing system 390 may implement traditional pairing strategies (e.g., FIFO or PBR) or some other pairing strategy that may be proprietary to the task assignment system 300. However, the internal pairing system 300 may also be in the form of the pairing system 100. The internal pairing system 390 may receive or otherwise retrieve information from the switch 380 about the agents 330 logged into the switch 380 and about the incoming tasks 320.

In the task assignment system 300, the external pairing system 395 may be communicatively coupled to the switch 380 via an interface 385. The interface 385 may isolate the task assignment system 300 from the external pairing system 395 (e.g., for security purposes), and control information exchanged between the two systems. An example of the interface 385 may be a public or a private proprietary application programming interface (API) provided over a network (e.g., the Internet or a telecommunications network) (not shown).

Unlike the internal pairing system 390, the external pairing system 395 may only have access to information that is selected and shared by the switch 380. Such information must be sufficient for the external pairing system 395 to determine the optimal task-agent pairing. The external pairing system 395 may be provided by a third-party vendor and may be in the form of the pairing system 100 described above. Importantly, the external pairing system 395 may provide a pairing strategy (e.g., BP) that improves the performance of the task assignment system 300 when compared to the pairing strategy (or strategies) of the internal pairing system 390. The external pairing system 395 may also provide the same or a similar pairing strategy as that of the internal pairing system 390.

The task assignment system 300 may operate under a shared control, in which the switch 380 may send route requests alternately between the internal pairing system 390 and the external pairing system 395 to determine which task is to be routed to which agent. The shared control may be desirable, for example, when the internal pairing system 390 employs a traditional or proprietary pairing strategy (e.g., FIFO or PBR) that may not be provided by the external pairing system 395, while the external pairing system 395 is used to provide a higher-performing pairing strategy (e.g., BP).

When the external pairing system 395 includes the same or a similar pairing strategy as that of the internal pairing system 390, the task assignment system 300 may operate under full control such that the switch 380 sends all route requests to the external pairing system 395. In other words, the external pairing system 395 has full control on determining every task-agent pairing. Under the full control, at times, the external pairing system 395 may simulate/mimic the pairing strategy of the internal pairing system 390 (e.g., FIFO or PBR) and, at other times, employ a different pairing strategy (e.g., BP), and send its pairing recommendation to the switch 380 over the interface 385. The switch 380 may then assign the tasks 320 to agents 330 based on the pairing recommendation.

In some embodiments, the operational control of the task assignment system 300 may be based on the classification of tasks 320 performed when the tasks are received. As the tasks 320 are received, they may be classified as "ON" tasks or "OFF" tasks. As described with respect to FIG. 1, the classification of tasks may be performed by a benchmarking module 160 part of pairing system 100. In some embodiments, the classification of tasks 320 may be performed by the switch 380 of the task assignment system 300. In some embodiments, the determination of the whether a task should be "ON" or "OFF" may be based on one or more predetermined schemes or an agreement between the task assignment system 300 and the external pairing system 395. See U.S. Pat. No. 9,712,676. An "ON" task is a task assigned to an agent by the external pairing module 395 using a higher-performing pairing strategy (e.g., BP). An "OFF" task is a task assigned to an agent using a traditional pairing strategy (e.g., FIFO or PBR) by either the internal pairing module 390 or the external pairing module 395. In such cases, the external pairing module 395 may assign the "OFF" task in full control of the task assignment system 300, or the internal pairing module 390 may assign the "OFF" task in shared control of the task assignment system 300.

Traditionally, in an L2 environment, when an agent becomes available, the task at the head of the queue would be selected for assignment to the agent. However, according to embodiments described in this disclosure, when an agent becomes available, switch 380 may generate an event which is sent to external pairing system 395 and internal pairing system 390 informing them that the agent is available for a task 320. The external pairing system 395 may perform a tie-breaking algorithm to determine whether the agent should be assigned to an "ON" task or an "OFF" task from a queue of tasks 320 that are pending. In case the agent is supposed to be assigned to an "ON" task 320, the external system 395 makes the pairing. In case the agent is supposed to be assigned to an "OFF" task, the external system 395 makes the pairing in full control mode or the internal system 390 makes the pairing in shared control mode.

An example of assigning a task to an available agent while using a tie-breaking algorithm is described below. For example, at the time switch 380 determines that an agent 330 is available, there may be a queue of ten pending tasks, one of which may be assigned to the available agent. As each of the ten tasks 320 are received, switch 380 in conjunction with the internal pairing system 390 and the external pairing system 395 may classify the tasks as "ON" or "OFF" (e.g., based on time of arrival of each task and cycling between ON and OFF at predetermined intervals ("epoch" benchmarking). The ten tasks 320 that are pending may be classified as either "ON" tasks or "OFF" tasks as follows:

$$1\text{-ON},2\text{-ON},3\text{-ON},4\text{-OFF},5\text{-OFF},6\text{-OFF},7\text{-OFF},8\text{-OFF},\\9\text{-ON},10\text{-ON} \quad (1)$$

In this example, many tie-breaking strategies may be used in order to determine which of the pending tasks from queue (1) may be assigned to the available agent. In some embodiments, a sequential tie-breaking algorithm may be used. The sequential tie-breaking strategy yields similar results when subjected to epoch or inline benchmarking. However, sequential tie-breaking is most effective when subjected to an inline benchmarking system.

The sequential tie-breaking system is applied on the queue of tasks (1) described above. First, the relative positions of the "OFF" tasks are secured. Therefore, in the order of selected tasks, the fourth, fifth, sixth, seventh, and eighth tasks that will be selected by the task assignment system 300 from the queue (1), will be the "OFF" tasks in the order that the "OFF" tasks are present in the queue (1). Upon securing the position of the "OFF" tasks, there still remain five empty slots for task assignment. The first, second, third, ninth, and tenth slots. In application of the sequential tie-breaking strategy, because the first three tasks are classified as "ON", the external pairing system 395 selects any three "ON" tasks of the five "ON" tasks of queue (1) as the first three tasks. Once a task of queue (1) has been selected, the selected task is no longer available for a subsequent selection. In some embodiments, the external pairing system 395 may pick the tenth task, 10-ON (also an "ON" task), as the first selection of a task for pairing. Subsequently, the second task, 2-ON, in the list is also an "ON" task. Again, external pairing system 395 may select any of the remaining "ON" tasks as the second selection of a task for pairing. In this example, the external pairing system 395 may select the fourth task, 4-ON, as the second selection of a task for pairing. Similarly, the third task, 3-ON, may be selected as the third selection of a task for pairing. Because three "ON" tasks have now been selected, the fourth task, 4-OFF, the fifth task, 5-OFF, the sixth task, 6-OFF, the seventh task, 7-OFF, and the eighth task, 8-OFF will be slotted for pairing in the fourth slot, the fifth slot, the sixth slot, the seventh slot, and the eighth slot, respectively. Then, for example, the ninth task, 9-ON, may be selected as the fourth selection of a task for pairing, and the first task, 1-ON, may be selected as the tenth selection of a task for pairing. In such example, the order in which the tasks were eventually assigned may look as follows:

$$10\text{-ON},2\text{-ON},3\text{-ON},4\text{-OFF},5\text{-OFF},6\text{-OFF},7\text{-OFF},8\text{-OFF},9\text{-ON},1\text{-ON} \qquad (2)$$

In this example, the tenth task, 10-ON, is selected for pairing based on information about the first task, 1-ON; that is, the tenth task, 10-ON is selected for pairing based on the information that the first task, 1-ON, is an ON task. Similarly, the first task, 1-ON is selected for pairing based on information about the tenth task, 1-ON; that is, the first task, 1-ON is selected for pairing based on the information that the tenth task, 10-ON, is an ON task. Accordingly, the tenth task, 10-ON, is selected for pairing based on information about the first task, 1-ON, which does not comprise pairing information of the first task, 1-ON.

In this example, the tasks 320 comprise three sets of tasks. A first set of tasks includes task 1-ON, task 2-ON, and task 3-ON; a second set of tasks includes task 4-OFF, task 5-OFF, task 6-OFF, task 7-OFF, and task 8-OFF; a third set of tasks includes task 9-ON and task 10-ON. In this example, no tasks are received between receiving the first set of tasks and the second set of tasks, and no tasks are received between receiving the second set of tasks and the third set of tasks. In some embodiments, the tasks 320 includes a fourth set of tasks including another number of OFF tasks. In some embodiments, the tasks 320 or the queue (1) includes any number of sets of tasks. Sets of tasks including OFF tasks are paired sequentially; that is, the tasks in the second set of tasks are necessarily paired before any of the tasks in the fourth set of tasks. Accordingly, tasks in the fourth set of tasks would be paired before any subsequent set of tasks comprising OFF tasks. However, as the above assignment (2) demonstrated, tasks from the third set of tasks can be selected for pairing before all tasks of the first set of tasks have been selected for pairing. As the above assignment (2) also demonstrated, tasks of the first set of tasks may be paired prior to pairing all tasks of the third set of tasks. In some embodiments, all tasks from the third set of tasks are selected for pairing before all tasks from the first set of tasks are selected for pairing. In some embodiments, some tasks from the third set of tasks are selected for pairing before all tasks from the first set of tasks are selected for pairing; and some tasks for the first set of tasks are selected for pairing before all tasks from the third set of tasks are selected for pairing.

Accordingly, as queue (1) and assignment (2) demonstrated, the task assignment system 300 may determine a task assignment for a slot in assignment (2) based on a classification of a task in the corresponding slot of queue (1). For example, when selecting a task for assignment to the first slot in assignment (2), the task assignment system 300 identifies that the task in the first slot of queue (1) is classified as 'ON'. When the 'ON' classification corresponds to a BP strategy, the task assignment system 300 selects a task for the first slot of assignment (2) from any available ON tasks in queue (1) based on the BP strategy. For example, when selecting a task assignment for the fourth slot in assignment (2), the task assignment system 300 identifies that the task fourth slot of queue (1) is classified as 'OFF'. When the 'OFF' classification corresponds to a FIFO pairing strategy, the task assignment system 300 selects tasks from queue (1) for the fourth slot based on an order of arrival (e.g., task 4-OFF is chosen before task 5-OFF).

In some embodiments, a queue length strategy may be used as a tie-breaking strategy. In applying the queue length strategy, the task assignment system 300 (switch 380 in combination with external pairing system 395 and internal pairing system 390) may determine the number of ON tasks (5 in this example) and the number of OFF tasks (also 5 in this example) from the queue (1) of tasks 320. The task assignment system uses a weighted random number to select from the set of "ON" tasks or "OFF" tasks of the queue (1) of tasks 320. The task assignment system 300 generates a weighted random number, and according to a value of the weighted random number, selects either an ON task or an OFF task. For example, the weighted random number is associated with a particular task in the queue (1) based on a value of the weighted random number.

For example, a random number may be generated and then weighted based on the distribution of ON tasks and OFF tasks in the task assignment system 300. In some embodiments, the task assignment system 300 attempts to retain a similar number of ON tasks and OFF tasks (e.g., the total number of ON tasks and the total number of OFF tasks have a difference of 1 task, 5 tasks, 10 tasks, or 20 tasks). For example, if the task assignment system 300 comprises four OFF tasks and six ON tasks in a queue, the generated random number is likelier to have a value associated with an OFF task than to have a value associated with an ON task.

In some configurations, the queue length technique can be considered "dangerous" when evaluated using the epoch benchmarking technique. This is because, in the queue length tie-breaking technique, the queue of tasks 320 that are pending in the current time period ("epoch") continues to grow, representing a larger proportion of tasks 320. This increases the proportion of tasks 320 of the current time period in the queue of tasks. This will in turn increase the likelihood that a task of the current time period will get selected, meanwhile, the tasks from the older cycle are stalled. The risk of starving these longer-waiting tasks can be mitigated by combining the queue length technique with "Front-N" tie-breaking technique. The "Front-N" tie-breaking technique is described in detail in, e.g., U.S. patent application Ser. No. 15/837,911, which is hereby incorporated by reference herein.

Another example of assigning a task to an available agent while using a tie-breaking algorithm is described below. In some embodiments where the task assignment system 300 is in an L3 state, the task assignment system 300 receives a plurality of available agents in addition to a queue of available tasks. In some examples, the queue includes three sets of tasks; the first set of tasks is an ON set of tasks, the second set of tasks is an OFF set of tasks, and the third set of tasks is an ON set of tasks. For example, any of the first, second, and third sets of tasks may have an elevated priority over priorities associated with the remaining sets of tasks. For example, the task assignment system may apply prioritization to the third set of contacts. However, the applied prioritization does not require that tasks of the third set of tasks are assigned before tasks of the second set of tasks because the second set of tasks and the third set of tasks have different ON/OFF statuses; for example, the applied prioritization may only require that tasks of the third set of tasks are assigned before tasks of the first set of tasks because both the first set of tasks and the third set of tasks have the same ON status.

In one exemplary embodiment where the task assignment system 300 is in an L3 state, the total number of available agents is greater than the number of tasks in the first set of tasks. The tie-breaking algorithm determines that all available agents will be paired to ON tasks (e.g., any of the tasks in the first set of tasks and the third set of tasks). After the available agents are paired, the OFF tasks from the second set of tasks are still waiting in queue, plus remainder ON tasks that were not already paired from the first set of tasks and the third set of tasks. In some examples, one or more of the available agents who was previously paired to a task in the queue may come available while the OFF tasks from the second set of tasks and remainder ON tasks that were not already paired are still waiting in queue. In some examples, the previously-paired and newly-available agents may now be paired to tasks in the second set of tasks.

In other embodiments of assigning a task to an available agent while using a tie-breaking algorithm, a queue wait strategy may be used as a tie-breaking strategy. In applying the queue wait strategy, the task assignment system 300 determines the average waiting time (or longest waiting time) for all the "ON" tasks and all the "OFF" tasks. For example, the average waiting time for the "ON" tasks may be 40 seconds, and the average waiting time for the "OFF" tasks may be 60 seconds. The task assignment system 300 uses a weighted random number to select "ON" or "OFF" tasks in proportion to the relative wait times. In this example, an "OFF" task may be 50% more likely to be selected because the wait time for an "OFF" task, on average, is 50% longer than the "ON" tasks. In the queue wait strategy, the wait times for the "ON" tasks and the "OFF" tasks change in real time, so, as in the example above, when more "OFF" tasks selected, the average waiting times eventually equalize. In such a case, the selection of "ON" tasks or "OFF" tasks will begin to approach 50-50 again.

In other embodiments of assigning a task to an available agent while using a tie-breaking algorithm, a queue flush strategy may be used as a tie-breaking strategy. This strategy may be used in conjunction with epoch benchmarking. In applying the queue flush strategy, the task assignment system 300 first assigns all remaining "ON" tasks from the prior time period (epoch) to available agents. While assigning the "ON" tasks of the prior epoch, the task assignment system 300 ignores any "OFF" and "ON" tasks that may have already arrived during any subsequent epochs. Upon assigning the "ON" tasks of the prior epoch, the task assignment system 300 then assigns the "OFF" tasks of the prior epoch, while still ignoring any tasks received during subsequent epochs. This process is repeated until there are no tasks 320 from the prior epoch that are pending.

In some embodiments, the external pairing system operates in a "stateless" environment, where the task assignment system 300 may provide enough information within each route request for the external pairing system 395 to make a pairing recommendation. For example, in addition to the control flag (indicating shared control or full control) and the benchmark flag (indicating ON tasks, OFF tasks, Default, or Monitor Mode), the task assignment system 300 may provide the external pairing system 395 with an adequate amount of state information within the route request (e.g., the complete set of agents available for pairing and the complete set of tasks available for pairing). In some embodiments, the stateless route request may include additional information, such as an ordered set of agents ordered by idle time and/or an ordered set of tasks ordered by waiting time.

In other embodiment, the external pairing system 395 may be in a "stateful" environment, where the task assignment system 300 provides event information over the interface 385 such that the external pairing system 395 may maintain a mirror image of the state of the task assignment system 300. In other words, every relevant event that takes place in task assignment system 300 is shared with the external pairing system 395, such as time of arrival of every task, when an agent becomes available, when an agent logs out, when a call hangs up (in the context of a call center), etc. The interface 385 may support error-checking or reset functionality to help the external pairing system 395 maintain fidelity in the mirrored state with the task assignment system 300.

The task assignment system 300 is illustrated as having a single queue with the single switch 380 for simplicity. The task assignment system 300 could include additional queues with corresponding switches, in which case, either each switch could be communicatively coupled to the internal pairing system 390 and the external pairing system 395, or there could an internal pairing system and an external pairing system for each switch.

Figure 4:
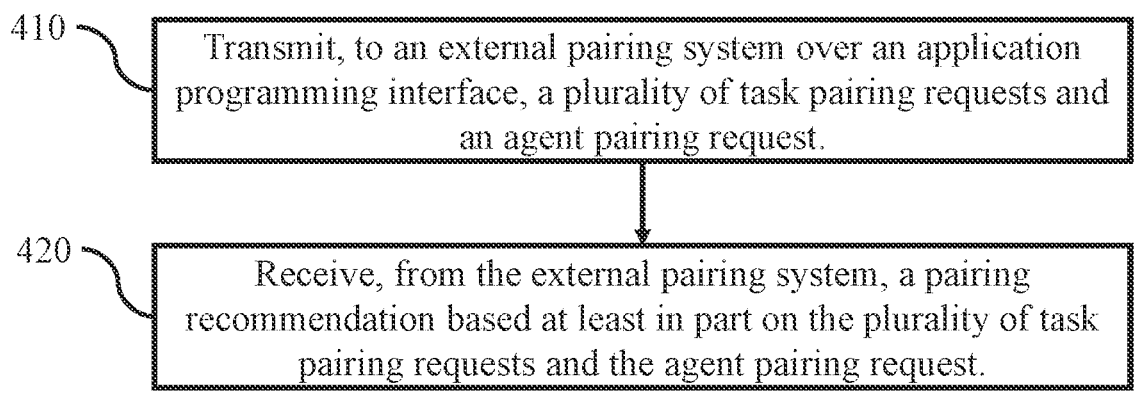
FIG. 4 shows a flow diagram of a method of sharing control of assigning tasks between an external pairing system and a task assignment system with an internal pairing system according to embodiments of the present disclosure.

FIG. 4 shows a flow diagram of a method 400 for sharing control of assigning tasks between an external pairing system (e.g., external pairing system 395) and a task assignment system (e.g., task assignment system 300) with an internal pairing system (e.g., internal pairing system 390) according to embodiments of the present disclosure.

The task assignment method 400 may begin at block 410. At block 410, a plurality of task pairing requests and an agent pairing request may be transmitted to the external pairing system over an API. As described above, the plurality of task pairing requests may be generated based on pending tasks (e.g., task(s) 320, queue (1)). As described above, the each of the plurality of tasks may be received at the switch 380 and be classified as an "OFF" task or an "ON" task. Tasks assigned as "ON" tasks may be assigned to available agents using a first pairing strategy (e.g., BP strategy) and tasks assigned to available agents as "OFF" may be assigned using a second pairing strategy (e.g., FIFO or PBR). Once the requests have been classified as "OFF" or "ON", they may be transmitted to the external pairing system 395. The agent pairing request may be generated based on an available agent (e.g., agent(s) 330). As described above, available agents may also be received at switch 380. The external pairing system 395 may perform a tie-breaking strategy to determine whether the first pairing strategy (e.g., BP strategy for "ON" tasks") or the second pairing strategy (FIFO or PBR for "OFF" tasks) will be used to pair a task pairing request of the plurality of task pairing requests with the agent pairing request. The tie-breaking strategies (e.g., sequential, queue wait, queue length, and queue flush) are described with respect to FIG. 3.

At block 420, a pairing recommendation, that is based at least in part on the plurality of task pairing requests, the first pairing strategy, the second pairing strategy, and the agent pairing request, may be received from the external pairing system. The pairing recommendation may pair the agent pairing request of available agent 330 to any one of the plurality of task pairing requests related to the pending tasks 330.

Figure 5:
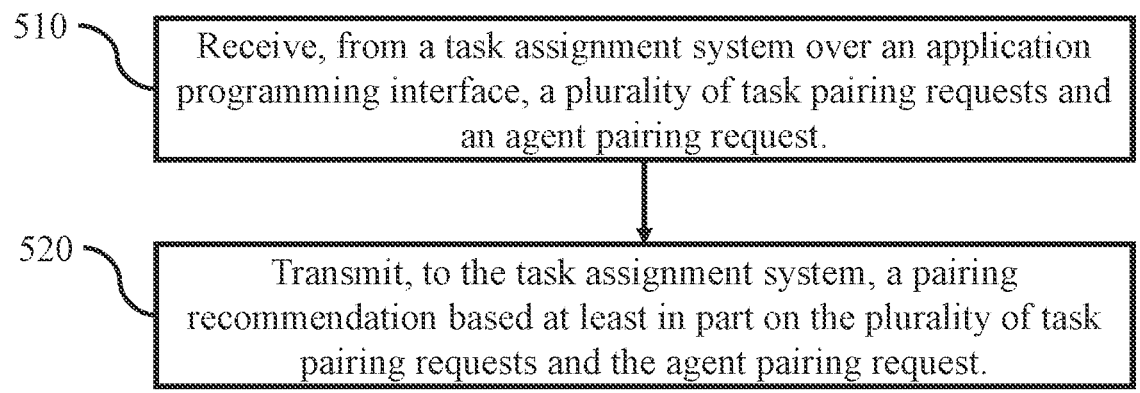
FIG. 5 shows a flow diagram of a method of sharing control of assigning tasks between an external pairing system and a task assignment system with an internal pairing system according to embodiments of the present disclosure.

FIG. 5 shows a flow diagram of a method 500 for sharing control of assigning tasks between an external pairing system (e.g., external pairing system 395) and a task assignment system (e.g., task assignment system 300) with an internal pairing system (e.g., internal pairing system) according to embodiments of the present disclosure.

The task assignment method 500 may begin at block 510. At block 510, a plurality of task pairing requests and an agent pairing request may be received from the task assignment system over an API. As described above, the plurality of task pairing requests may be generated based on pending tasks (e.g., task(s) 320, queue (1)). As described above, the each of the plurality of tasks may be received at the switch 380 and be classified as an "OFF" task or an "ON" task. Tasks assigned as "ON" tasks may be assigned to available agents using a first pairing strategy (e.g., BP strategy) and tasks assigned to available agents as "OFF" may be assigned using a second pairing strategy (e.g., FIFO or PBR). Once the requests have been classified as "OFF" or "ON", they may be transmitted to the external pairing system 395. The agent pairing request may be generated based on an available agent (e.g., agent(s) 330). As described above, available agents may also be received at switch 380. The external pairing system 395 may perform a tie-breaking strategy to determine whether the first pairing strategy (e.g., BP strategy for "ON" tasks") or the second pairing strategy (FIFO or PBR for "OFF" tasks) will be used to pair a task pairing request of the plurality of task pairing requests with the agent pairing request. The tie-breaking strategies (e.g., sequential, queue wait, queue length, and queue flush) are described with respect to FIG. 3.

At block 520, a pairing recommendation, that is based at least in part on the plurality of task pairing requests, the first pairing strategy, the second pairing strategy, and the agent pairing request, may be transmitted to the task assignment system. The pairing recommendation may pair the agent pairing request of available agent 330 to any one of the plurality of task pairing requests related to the pending tasks 320.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for pairing contacts and agents in a contact center system comprising:
   determining, by at least one computer processor communicatively coupled to and configured to operate in the contact center system, a first set of contacts to be paired using a first pairing strategy;
   determining, by the at least one computer processor, a second set of contacts to be paired using a second pairing strategy;
   determining, by the at least one computer processor, a third set of contacts to be paired using the first pairing strategy;
   determining, by the at least one computer processor, a fourth set of contacts to be paired using the second pairing strategy; and
   connecting, by the at least one computer processor, contacts of the first, second, third, and fourth sets of contacts to agents in the contact center based on a pairing strategy associated with each contact,
   wherein the second set of contacts arrived after the first set of contacts,
   wherein the third set of contacts arrived after the second set of contacts,
   wherein the fourth set of contacts arrived after the third set of contacts,
   wherein all contacts of the second set of contacts must be paired, using the second pairing strategy, prior to pairing any of the contacts of the fourth set of contacts,
   wherein the connecting further comprises selecting at least one contact of the third set of contacts for pairing before all contacts of the first set of contacts are paired and selecting at least one contact of the first set of contacts for pairing before all contacts of the third set of contacts are paired,
   wherein there exists an agent in the contact center system available for pairing under both the first and second pairing strategies.

2. The method of claim 1, wherein the first pairing strategy is a behavioral pairing strategy.

3. The method of claim 1, wherein the second pairing strategy is a first-in, first-out (FIFO) pairing strategy.

4. The method of claim 1, further comprising:
   selecting, by the at least one computer processor, the first pairing strategy or the second pairing strategy based on a tie-breaking strategy; and
   selecting, by the at least one computer processor, a contact of the first, second, third, or fourth sets of contacts for pairing based on the selected pairing strategy.

5. The method of claim 4, wherein the tie-breaking strategy is one of a queue flush strategy, a queue length strategy, a queue wait strategy, or a sequential strategy.

6. The method of claim 1, wherein the first pairing strategy is provided by an external pairing system, and the second pairing strategy is provided by one of the external pairing system and an internal pairing system of the contact center system.

7. A system for pairing contacts and agents in a contact center system comprising:
  at least one computer processor communicatively coupled to and configured to operate in the contact center system, wherein the at least one computer processor is further configured to:
    determine a first set of contacts to be paired using a first pairing strategy;
    determine a second set of contacts to be paired using a second pairing strategy;
    determine a third set of contacts to be paired using the first pairing strategy;
    determine a fourth set of contacts to be paired using the second pairing strategy; and
    connect contacts of the first, second, third, and fourth sets of contacts to agents in the contact center based on a pairing strategy associated with each contact,
  wherein the second set of contacts arrived after the first set of contacts,
  wherein the third set of contacts arrived after the second set of contacts,
  wherein the fourth set of contacts arrived after the third set of contacts,
  wherein all contacts of the second set of contacts must be paired, using the second pairing strategy, prior to pairing any of the contacts of the fourth set of contacts,
  wherein the connecting further comprises selecting at least one contact of the third set of contacts for pairing before all contacts of the first set of contacts are paired and selecting at least one contact of the first set of contacts for pairing before all contacts of the third set of contacts are paired,
  wherein there exists an agent in the contact center system available for pairing under both the first and second pairing strategies.

8. The system of claim 7, wherein the first pairing strategy is a behavioral pairing strategy.

9. The system of claim 7, wherein the second pairing strategy is a first-in, first-out (FIFO) pairing strategy.

10. The system of claim 7, wherein the at least one computer processor is further configured to:
  select the first pairing strategy or the second pairing strategy based on a tie-breaking strategy; and
  select a contact of the first, second, third, or fourth sets of contacts for pairing based on the selected pairing strategy.

11. The system of claim 10, wherein the tie-breaking strategy is one of a queue flush strategy, a queue length strategy, a queue wait strategy, or a sequential strategy.

12. The system of claim 7, wherein the first pairing strategy is provided by an external pairing system, and the second pairing strategy is provided by one of the external pairing system and an internal pairing system of the contact center system.

13. An article of manufacture for pairing contacts and agents in a contact center system comprising:
  a non-transitory processor readable medium; and
  instructions stored on the medium;
  wherein the instructions are configured to be readable from the medium by at least one computer processor communicatively coupled to and configured to operate in the contact center system and thereby cause the at least one computer processor to operate so as to:
    determine a first set of contacts to be paired using a first pairing strategy;
    determine a second set of contacts to be paired using a second pairing strategy;
    determine a third set of contacts to be paired using the first pairing strategy;
    determine a fourth set of contacts to be paired using the second pairing strategy; and
    connect contacts of the first, second, third, and fourth sets of contacts to agents in the contact center based on a pairing strategy associated with each contact,
  wherein the second set of contacts arrived after the first set of contacts,
  wherein the third set of contacts arrived after the second set of contacts,
  wherein the fourth set of contacts arrived after the third set of contacts,
  wherein all contacts of the second set of contacts must be paired, using the second pairing strategy, prior to pairing any of the contacts of the fourth set of contacts,
  wherein the connecting further comprises selecting at least one contact of the third set of contacts for pairing before all contacts of the first set of contacts are paired and selecting at least one contact of the first set of contacts for pairing before all contacts of the third set of contacts are paired,
  wherein there exists an agent in the contact center system available for pairing under both the first and second pairing strategies.

14. The article of manufacture of claim 13, wherein the first pairing strategy is a behavioral pairing strategy.

15. The article of manufacture of claim 13, wherein the second pairing strategy is a first-in, first-out (FIFO) pairing strategy.

16. The article of manufacture of claim 13, wherein the instructions are further configured to cause the at least one computer processor to operate so as to:
  select the first pairing strategy or the second pairing strategy based on a tie-breaking strategy; and
  select a contact of the first, second, third, or fourth sets of contacts for pairing based on the selected pairing strategy.

17. The article of manufacture of claim 16, wherein the tie-breaking strategy is one of a queue flush strategy, a queue length strategy, a queue wait strategy, or a sequential strategy.

18. The article of manufacture of claim 13, wherein the first pairing strategy is provided by an external pairing system, and the second pairing strategy is provided by one of the external pairing system and an internal pairing system of the contact center system.

* * * * *

UNITED STATES PATENT AND TRADEMARK OFFICE
CERTIFICATE OF CORRECTION

| | |
|---|---|
| PATENT NO. | : 11,050,886 B1 |
| APPLICATION NO. | : 17/167920 |
| DATED | : June 29, 2021 |
| INVENTOR(S) | : Ain Chishty et al. |

It is certified that error appears in the above-identified patent and that said Letters Patent is hereby corrected as shown below:

In the Specification

At Column 14, Line numbers 27-37, should read as follows:
For example, a random number may be generated and then weighted based on the distribution of ON tasks and OFF tasks in the task assignment system 300. In some embodiments, the task assignment system 300 attempts to retain a similar number of ON tasks and OFF tasks (e.g., the total number of ON tasks and the total number of OFF tasks have a difference of 1 task, 5 tasks, 10 tasks, or 20 tasks). For example, if the task assignment system 300 comprises four OFF tasks and six ON tasks in a queue, the generated random number is likelier to have a value associated with an ON task than to have a value associated with an OFF task.

Signed and Sealed this
Thirty-first Day of May, 2022

Katherine Kelly Vidal
*Director of the United States Patent and Trademark Office*